(No Model.)

W. D. OVER.
BAGGAGE TRUCK.

No. 554,196.  Patented Feb. 4, 1896.

Witnesses.
John C. Grim
John M. Killits

Inventor.
Willis D. Over

UNITED STATES PATENT OFFICE.

WILLIS D. OVER, OF BRYAN, OHIO.

BAGGAGE-TRUCK.

SPECIFICATION forming part of Letters Patent No. 554,196, dated February 4, 1896.

Application filed March 12, 1895. Serial No. 541,472. (No model.)

*To all whom it may concern:*

Be it known that I, WILLIS D. OVER, of Bryan, in the county of Williams and State of Ohio, have invented certain new and useful Improvements in Baggage-Trucks; and I do hereby declare the following to be a full, clear, and exact description of the same, reference being had to the accompanying drawings, forming a part of this specification, and to the letters of reference marked thereon.

This invention relates to improvements in trucks, and particularly to such as are employed in transporting baggage around railway-depots to and from baggage cars and rooms.

The objects of the invention are to facilitate the handling of baggage, whereby not only is the labor lessened, but the wear and tear on the baggage proportionately reduced.

The invention consists in certain novel details of construction and combinations and arrangements of parts, all as will be now described, and pointed out particularly in the appended claims.

Figure 1:
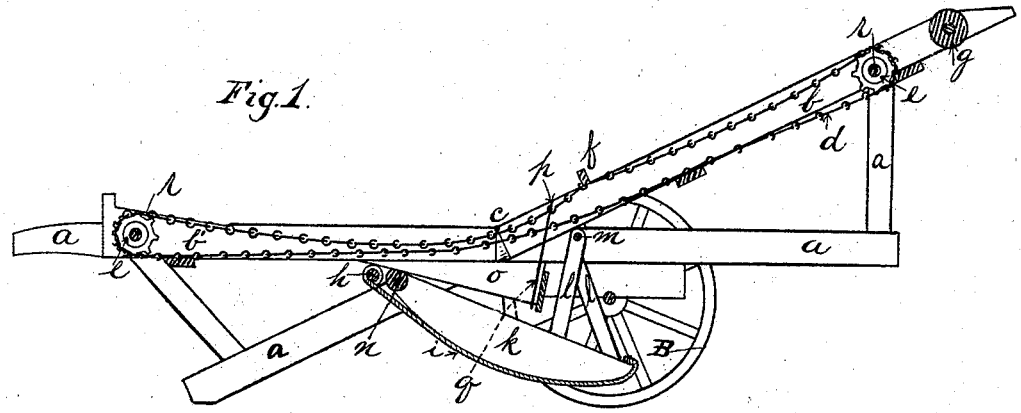
Figure 2:
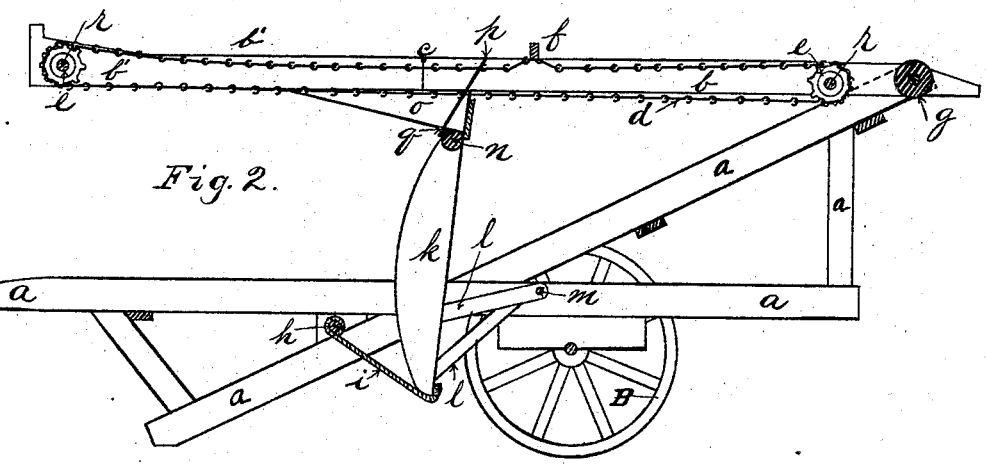
Figure 3:
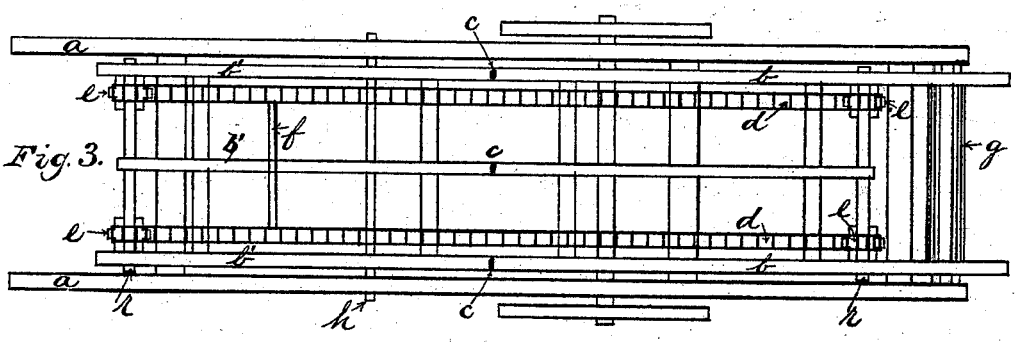

Referring to the accompanying drawings, Figures 1 and 2 are longitudinal sectional views through a truck embodying my invention. Fig. 3 is a top plan view of the same.

Like letters of reference in the several figures denote the same parts.

The truck-frame proper, lettered $a$, is of the usual type—that is to say, it consists of long timbers crossing each other and pivoted on the axle of a pair of truck-wheels B. The lower and upper ends of the respective timbers serve the purpose of legs and handles, respectively. With this arrangement when the truck is in normal position, with the rear legs resting on the floor, the forward end is elevated to about the level of a baggage-car floor, and in the unloading of the baggage from the car it is slipped down the incline and either comes to rest on the now horizontal portion or against the baggage already unloaded. When it is desired to load baggage into the car, however, it cannot be done so readily, and with a view more especially to facilitating the latter operation I provide a supplemental jointed frame, which I hinge to the forward end of the truck, and provide means for raising the rear end, together with the baggage held thereon, to about the level of the floor of the car, and in addition I provide a means for advancing the baggage bodily to the front end of the truck.

By reference to the drawings it will be seen that to the front end of the truck and hinged on the journals of the roller $g$ is a supplemental frame $b$ of a length corresponding to the length of the front end of the truck proper forward of the angle in its floor. To the end of the supplemental frame $b$ I hinge by an elbow or rule joint a second supplemental frame $b'$. Thus with the parts in normal position, as in Fig. 1, the truck presents the ordinary appearance; but when the supplemental frame is swung up on its pivot, as in Fig. 2, a straight platform is formed on a level with the front end of the truck, from which platform baggage may be unloaded with the greatest facility.

As a means for raising the supplemental frame I have shown an elevating-frame $k$, carried by brace-arms $l$ pivoted at $m$ to the truck-frame. The elevating-frame has a roller $n$ at the top adapted to work against a bearing or incline $o$ on the frame $b'$. The elevating-frame is swung up by a rope or flexible connection $i$ connected thereto at the forward end and adapted to be wound on the shaft $h$, which latter may be turned in any suitable manner. The forward end of the bearing $o$ extends past the under side of the hinge-joint $c$ between the sections of the supplemental frame, and a link $q$ pivoted at $p$ serves to prevent the frame from doubling to a greater angle than that of the truck-floor or top frame.

To further facilitate the loading of baggage into the car I provide at opposite ends of the supplemental frame sprocket-wheels $e$ journaled on shafts $r$, and over these wheels I pass endless chains $d$, to which motion may be imparted for advancing the baggage by turning one of the shafts, in which instance the sprocket-wheels should be fastened rigidly to the shaft. The chains may be provided with a cross-piece $f$ adapted to slide on the supplemental frame or a center bar thereof. (Shown clearly in Fig. 3.)

When the supplemental frame is lowered to the position shown in Fig. 1, the chain, it will be noted, is slack, and hence the truck may be employed in the ordinary manner.

From the foregoing it will be seen that I have produced a truck which may be used in identically the same manner as the ordinary truck, or if desired it may be employed to hoist the baggage up to the level of the car-floor or other elevated floor onto which it is desired to transfer it.

Should it be so desired the ordinary truck now in use may be easily and cheaply altered to embody the invention, and such alteration will, while adding greatly to its usefulness, in no wise prevent its use as before.

Having thus described my invention, what I claim as new, and desire to secure by Letters Patent, is—

1. In a baggage-truck, the combination with the truck-frame forming an angular platform, of a supplemental frame hinged thereto at the forward end, and itself jointed at a point in proximity to the angle in the truck-platform, whereby its two sections may be straightened out to form a horizontal platform, and means for raising the supplemental frame; substantially as described.

2. In a baggage-truck, the combination with the truck-frame forming an angular platform, of a supplemental frame $b$ hinged to the forward end of the truck-frame, a second supplemental frame $b'$ hinged with an elbow or rule-joint to the rear end of the frame $b$ and means for raising the supplemental frames to form a straight horizontal platform; substantially as described.

3. In a baggage-truck, the combination with the truck-frame forming an angular platform, of a supplemental frame hinged to said platform at the forward end, a second supplemental frame hinged to the first, a link for limiting the folding of the sections of the supplemental frame, and means for elevating the rear end of the supplemental frame with relation to the truck, whereby a straight horizontal platform may be formed; substantially as described.

4. In a baggage-truck, the combination with the frame having the angular platform, the supplemental frame hinged thereto at the forward end and a second supplemental frame hinged to the first, of the elevating-frame co-operating with the rear section of the supplemental frame, substantially as described.

5. In a baggage-truck, the combination with the frame having the angular platform and supplemental frame hinged thereto and having the long bearing-surface on the under side bridging the joint between the frames, of the elevator-frame pivoted on the truck-frame and traveling on the bearing on the supplemental frame across the hinge-joint, when turned to elevate the same; substantially as described.

6. In a baggage-truck, the combination with the truck-frame having the angular platform, the frame $b$ hinged to said platform at the forward end, the frame $b'$ hinged to the frame $b$ at the rear end and means for raising said frames into horizontal position, of sprocket-wheels on the frames $b$ and $b'$ and endless chains running over said sprocket-wheels and bridging the joint between the frame, whereby said chains are slack when the sections of the supplemental frame are folded down; substantially as described.

WILLIS D. OVER.

Witnesses:
C. H. MASTERS,
JOHN B. WHITE.